United States Patent
Powers et al.

(10) Patent No.: US 12,175,103 B1
(45) Date of Patent: Dec. 24, 2024

(54) SYSTEMS AND METHODS FOR MAPPING DATA STRUCTURES TO MEMORY IN MULTI-LEVEL MEMORY HIERARCHIES

(71) Applicant: Architecture Technology Corporation, Minneapolis, MN (US)

(72) Inventors: Judson Powers, Ithaca, NY (US); Colleen Kimball, Ithaca, NY (US); Matthew A. Stillerman, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 543 days.

(21) Appl. No.: 16/126,728

(22) Filed: Sep. 10, 2018

Related U.S. Application Data (60) Provisional application No. 62/667,216, filed on May 4, 2018.

(51) Int. Cl.
  *G06F 3/06* (2006.01)

(52) U.S. Cl.
  CPC ........ *G06F 3/0631* (2013.01); *G06F 3/0604* (2013.01); *G06F 3/0683* (2013.01)

(58) Field of Classification Search
  CPC ..... G06F 3/0631; G06F 3/0604; G06F 3/0683
  See application file for complete search history.

(56) References Cited

U.S. PATENT DOCUMENTS

| | | | | |
|---|---|---|---|---|
| 8,380,928 | B1* | 2/2013 | Chen | G06F 3/061 711/117 |
| 2012/0022832 | A1* | 1/2012 | Shannon | G06F 11/348 702/189 |
| 2015/0067622 | A1* | 3/2015 | Goswami | G06F 30/20 716/106 |
| 2015/0277872 | A1* | 10/2015 | Gschwind | G06F 9/45516 717/153 |
| 2016/0162406 | A1* | 6/2016 | Latorre | G06F 9/528 711/122 |
| 2018/0165205 | A1* | 6/2018 | Sasanka | G06F 12/128 |

OTHER PUBLICATIONS

Hobbs, Information lifecycle management for business data, An Oracle White Paper (2007) [retrieved from internet Oct. 30, 2019][<URL:http://www.oracle.com/us/026964.pdf>] (Year: 2007).*

(Continued)

*Primary Examiner* — David Yi
*Assistant Examiner* — Nicholas A. Paperno
(74) *Attorney, Agent, or Firm* — Shumaker & Sieffert, P.A.

(57) ABSTRACT

Systems and methods for analyzing memory architectures and for mapping data structures in software programs to appropriate memory to take advantage of the different memory architectures. A computer architecture having a processor connected to one or more first memories and one or more second memories is defined, wherein the first memories and the second memories are characterized by different performance profiles. An executable of a software program is instrumented to capture, during runtime, patterns of access to selected data structures of the executable. Based on an analysis of the patterns of access, allocation of the selected data structures between the first and second memories is determined.

15 Claims, 5 Drawing Sheets

(56) References Cited

OTHER PUBLICATIONS

Zorn et al., Evaluating models of memory allocation, ACM Transactions on Modeling and Computer Simulation (TOMACS), vol. 4, No. 1, pp. 107-131, 1994 [retrieved from internet Oct. 30, 2019][<URL:https://dl.acm.org/citation.cfm?id=174624>] (Year: 1994).*

Weidendorfer et al., A tool suite for simulation based analysis of memory access behavior. International Conference on Computational Science. Springer, Berlin, Heidelberg, 2004 [retrieved from internet Oct. 30, 2019][<URL:https://link.springer.com/content/pdf/10.1007/978-3-540-24688-6_58.pdf>] (Year: 2004).*

Bill Bitner, INtroduction to Virtualization: z/VM Basic Concepts and Terminology, IBM, 2013 [retrieved from internet Feb. 16, 2021][<URL:https://www.vm.ibm.com/devpages/bitner/presentations/virtualb.pdf>] (Year: 2013).*

Bernat et al., "Anywhere, Any-Time Binary Instrumentation," Proceedings of the 10th ACM SIGPLAN-SIGSOFT workshop on Program analysis for software tools, Szeged, Hungary, Sep. 5, 2011, 9 pp.

Grunwald et al., "Improving the Cache Locality of Memory," PLDI '93 Proceedings of the ACM SIGPLAN 1993 conference on Programming language design and implementation, Albuquerque, New Mexico, Jun. 21-25, 1993, 10 pp.

Laurenzano et al., "A Static Binary Instrumentation Threading Model for Fast Memory Trace Collection," SCC '12 Proceedings of the 2012 SC Companion: High Performance Computing, Networking Storage and Analysis, Washington, DC, Nov. 10-16, 2012, 5 pp.

Laurenzano et al., "PEBIL: Efficient Static Binary Instrumentation for Linux," 2010 IEEE International Symposium on Performance Analysis of Systems & Software (ISPASS), White Plains, New York, Mar. 28-30, 2010, 9 pp.

Nieplocha et al., "Explicit Management of Memory Hierarchy," in: Grandinetti L., Kowalik J., Vajtersic M. (eds) Advances in High Performance Computing. NATO ASI Series (3. High Technology), vol. 30. Springer, Dordrecht. Applicant points out, in accordance with MPEP 609.04(a), that the year of publication, 1997, is sufficiently earlier than the effective U.S. filing date, so that the particular month of publication is not in issue.).

Olschanowsky et al., "PSnAP: Accurate Synthetic Address Streams Through Memory Profiles," International Workshop on Languages and Compilers for Parallel Computing, Oct. 8, 2009, 15 pp.

Zhang et al., "A Platform for Secure Static Binary Instrumentation," Proceedings of the 10th ACM SIGPLAN/SIGOPS International conference on Virtual execution environments, Salt Lake City, Utah, Mar. 1-2, 2014, 12 pp.

* cited by examiner

```
==31337== Bandwidth-limited memory access (34% processor cycles
lost) in function
==31337==    at 0x100000008F: matrix_multiply (example.c:85)
==31337==    by 0x100000C22: main (example.c:187)
==31337== Memory region 0x10042c148 : 0x10842C148 is in a block
of size 134217728 (128M) alloc'd on DDR4 memory
==31337==    at 0x1000161EF: malloc (replace_malloc.c:123)
==31337==    by 0x100000C22: main (example.c:175)
==31337== Predicted lost cycles for other allocations:
==31337==    MCDRAM: 0% (+52% performance)
==31337==
==31337== PERFORMANCE SUMMARY:
==31337==    DDR4: 134426240 bytes alloc'd
==31337==    MCDRAM: 0 bytes alloc'd
==31337==    Total cycles lost: 32%
==31337==    Total bandwidth-limited memory: 134217728
```

SYSTEMS AND METHODS FOR MAPPING DATA STRUCTURES TO MEMORY IN MULTI-LEVEL MEMORY HIERARCHIES

This application claims the benefit of U.S. Provisional Application No. 62/667,216, filed May 4, 2018, the entire contents of which are incorporated herein by reference.

GOVERNMENT RIGHTS IN THE INVENTION

This invention was made with government support under Contract No. HDTRA-18-P-0005 awarded by the Defense Threat Reduction Agency. The government has certain rights in this invention.

FIELD OF THE INVENTION

The disclosure relates to computer processing, and more particularly to methods of mapping data structures to multi-level memory hierarchies.

BACKGROUND

Modern high-performance computing (HPC) architectures featuring deep multi-level memory hierarchies promise improved performance but may require optimized placement of data structures in memory to obtain maximum performance. Some HPC architectures offer configurable, higher bandwidth memory that, when used in conjunction with standard dynamic random access memory (DRAM), may dramatically speed up aspects of a computer program. Other HPC architectures offer non-uniform memory architectures where incorrect placement of a data structure may add excessive memory latency to each memory access. Many HPC architectures place the onus on the user to tune their software and the placement of data structures to the architecture.

SUMMARY

As noted above, modern HPC architectures feature multi-level memory hierarchies that promise improved performance but require careful data structure placement to obtain a desired level of performance. Various example implementations of this disclosure include systems, methods, devices, and techniques for analyzing a broad range of memory architectures and for mapping data structures in software programs to appropriate memory to take advantage of the different memory architectures.

In one example, a system includes one or more processors and a memory operably coupled to the one or more processors, the memory including an executable of a software program. The one or more processors are configured to define, in the memory, a computer architecture having a processor connected to one or more first memories and one or more second memories, wherein the first memories and the second memories are characterized by different performance profiles, instrument the executable to capture, during runtime, patterns of access to selected data structures of the executable, and determine, based on an analysis of the patterns of access, allocation of the selected data structures between the first and second memories.

In another example, a method includes defining a computer architecture having a processor connected to one or more first memories and one or more second memories, wherein the first memories and the second memories are characterized by different performance profiles, instrumenting an executable of a software program to capture, during runtime, patterns of access to selected data structures of the executable and determining, based on an analysis of the patterns of access, allocation of the selected data structures between the first and second memories.

In yet another example, a computer-readable data storage device stores instructions that, when executed, cause a computing device comprising one or more processors to define, in one or more memory components, a computer architecture having a processor connected to one or more first memories and one or more second memories, wherein the first memories and the second memories are characterized by different performance profiles, instrument an executable of a software program to capture, during runtime, patterns of access to selected data structures of the executable, and determine, based on an analysis of the patterns of access, allocation of the selected data structures between the first and second memories.

The details of one or more examples are set forth in the accompanying drawings and the description below. Other features, objects, and advantages of the disclosure will be apparent from the description and drawings, and from the claims.

DETAILED DESCRIPTION

Modern high-performance computing (HPC) architectures feature deep memory hierarchies that promise improved performance but require optimization of data structure placement in order to obtain maximum performance. For instance, the Intel® Xeon Phi™ Many-Integrated-Core (MIC) processor includes Multi-Channel Dynamic Random Access Memory (MCDRAM), a 3D-stacked Dynamic Random Access Memory (DRAM) that can be configured to provide a size-constrained local, high-bandwidth, memory to local processors. MCDRAM is a small capacity but high bandwidth memory structure that can be used as a third level cache, as a separate and distinct non-uniform memory access (NUMA) memory, or as a combination of both. As such, when properly configured, MCDRAM may provide a substantial performance boost to computationally-intensive code, since this code is often limited by memory bandwidth. Similar architectures are used on graphics processing units (GPUs), such as the AMD® Fiji and the NVIDIA® Tesla, and on other HPC computing hardware. Such non-uniform memory architectures (NUMA) tend to reward careful placement of data structures.

One challenge in taking full advantage of the variety of available deep memory architectures lies in selecting the data structures to place in the high-bandwidth memory (HBM). Unlike cache memory, which is managed automatically by the processor (at the cost of added latency), the user of HBM may choose to allocate data structures into the HBM. If, as is typical, the software may be used with more data than will fit in the HBM, the software developer may select the data structures to store in HBM versus main memory, with the goal of maximally utilizing the performance boost offered by the HBM. This problem is similar to the problem of GPU memory optimization, where both the type of memory and the memory access pattern have a significant performance impact and developers may have a variety of ways they can restructure their programs to optimize the use of fast memory. This problem is also similar to optimization problems on multi-processor NUMA (non-uniform memory access) systems, where different memory regions have different performance characteristics. The following disclosure details systems, methods, devices, and techniques for analyzing execution of particular computer programs across a broad range of memory technologies and hierarchies to identify data structure placements that enhance computing performance.

Figure 1:
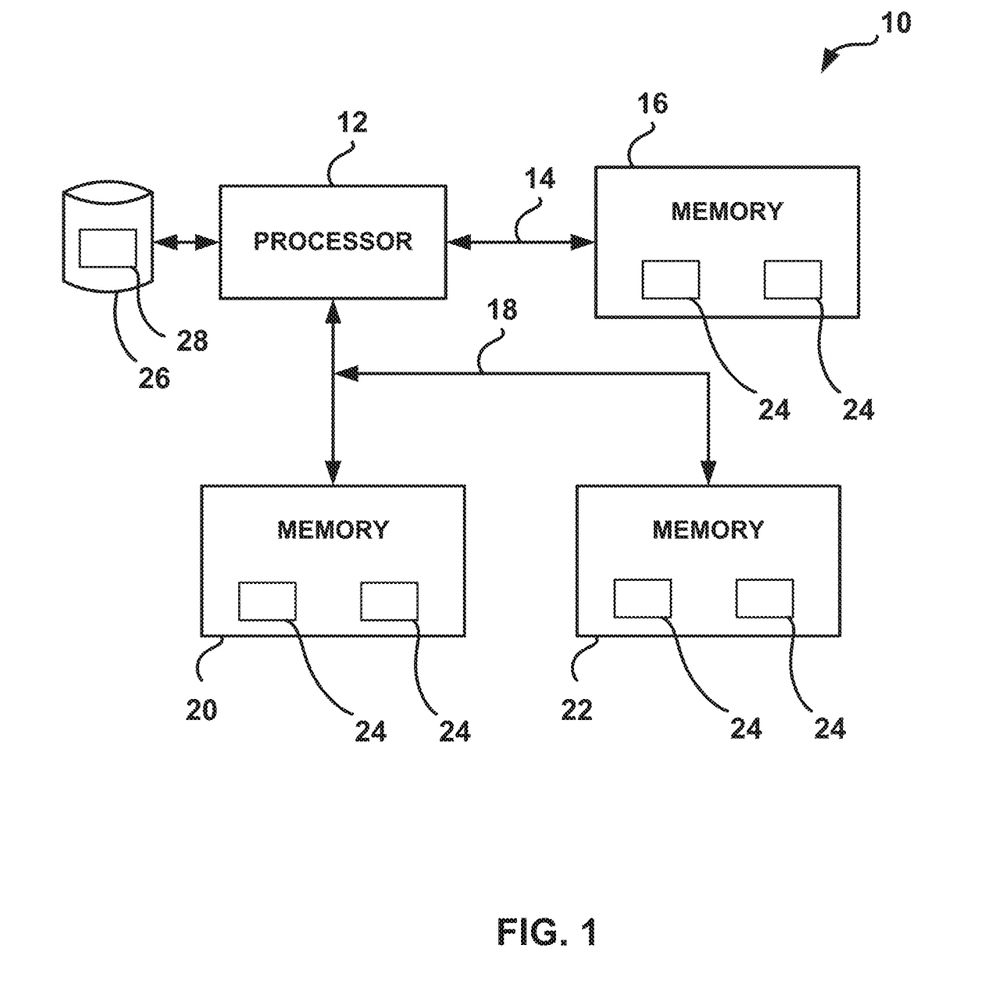
FIG. 1 is a conceptual diagram of a computing system having a non-uniform memory architecture, in accordance with aspects of the present disclosure.

FIG. 1 is a conceptual diagram of a computing system having a non-uniform memory architecture, in accordance with aspects of the present disclosure. In computing system 10 of FIG. 1, one or more processors 12 are connected over a first communications link 14 to a first memory 16 and over a second communications link 18 to a second memory 20 and a third memory 22. In one example approach, one or more data structures 24 are assigned to each of memories 16 and 20. In another example approach, one or more data structures are assigned to each of memories 16, 20 and 22.

In one example approach, one or more of memories 16, 20 and 22 have a performance profile that is different than the other memories. In one such example approach, communications link 14 is a higher bandwidth communications link while communications link 18 is a lower bandwidth communications channel. Typically, one would prefer to assign data structures to memories that can take advantage of the access patterns of the data structure. For instance, one may want to assign those data structures 24 that can take advantage of low latency memory access to memory 16, with the remaining data structures distributed to memories 20 and 22.

In NUMA architectures, memory accesses to memories 20 and 22 may be higher latency transactions than memory accesses to first memory 16. This may be due to latency characteristic of the type of memory (memory latency), may be due to latency characteristic of the communications link (network latency), or both. In a NUMA architecture, some portion of memory may be located a significant number of system clock cycles away from processor 12. In addition, memory having different data density/data access speed profiles may be used. In a NUMA version of the Intel® Xeon Phi™ platform described above, first memory 16 is low latency MCDRAM memory accessed via a high bandwidth data channel (communications link 14) while memory 20 is standard DDR4 random access memory (RAM) accessed over the standard memory interface (communications link 18).

The challenge in taking full advantage of HPC architectures, such as the architecture shown in FIG. 1, is in placing data structures in positions that take advantage of the differing performance profiles in such areas as, for instance, memory performance and latency. In one example approach, a software tool (e.g., called a Memory Instrumentation and Performance Simulation (MIPS) software tool) analyzes memory in HPC memory architectures and places data structures in that memory based on the memory analysis. In one example approach, a software tool directly instruments optimized binaries, without requiring source code or modification of the software build process. The tool then models the behavior of the complete memory hierarchy of a computing system such as computing system 10, and uses this analysis to produce actionable advice on memory placement. The tool therefore provides the capability to apply memory placement optimization without requiring source code changes, enabling a single software executable to be used on differently-configured systems and for different use cases without requiring software re-engineering and without giving up potential performance.

In some example approaches, automated tools are used within the MIPS software to place data structures in memories 16, 20 and 24. Manual analysis and optimization is error-prone and extremely time-consuming, and modern memory architectures are complex, with multiple stacked caches and very different costs for different memory accesses. Further, modern processors and compilers, using a model of the system's memory behavior, automatically re-order instructions and perform other optimizations to minimize the impact of memory latency and improve performance. The result is that the code executed may bear little resemblance to the source code as written, which limits a developer's ability to manually analyze its expected performance. One approach to reliably measure the performance impact of memory accesses is to use software tools to perform direct testing on optimized executables.

One technical challenge, then, in optimizing memory placement is instrumenting a software program to record memory access patterns and modeling the behavior of the different parts of the system's memory architecture. This analytical model can then be used to automatically optimize the placement of data structures in memory, based on the computed impact on performance.

A further problem is that most software programs do not have a single optimal placement of data structures. Optimal performance cannot, therefore, be guaranteed if data structure placement decisions are made at development time. Consider a simple HPC application that uses only two large arrays, the size of which are dependent on the input data size. For input A, the arrays are 4 GB and 8 GB, and peak performance is obtained when both are allocated on the MCDRAM (which is 16 GB in current Intel® Xeon Phi™ products). For input B, the arrays are 8 GB and 16 GB; testing indicates that peak performance is obtained when the smaller array is allocated on the MCDRAM. A static development-time memory allocation choice may not be able to optimize both cases: either the program will fail with input B (not enough memory for both arrays), or it will get suboptimal performance with input A (MCDRAM is underutilized). While the issue in this simple program could be solved with a heuristic, that approach is infeasible for more complex real-world software. The situation is further complicated when a new product with 32 GB of MCDRAM is released, which allows for both arrays to be allocated in the MCDRAM, or when the program is ported to a new memory architecture.

One current approach to this problem is for software developers to optimize their code by testing with representative inputs on typical hardware. This approach generally results in sub-optimal performance and results in software needing to be periodically re-engineered as both inputs and hardware capabilities change with technological development. A better solution would be for the user to perform testing using real inputs and their own hardware and for the software to use the results of those tests to optimize itself for the computational task and hardware at hand.

In one example, system 10 stores software on nonvolatile memory 26 as program code 28. In one such example approach, program code 28 includes instructions that, when executed by one or more of the processors 12, establish the MIPS software tool on computing system 10. In one example approach, the MIPS software tool performs HPC-oriented data placement optimization across a variety of memory architectures and memory hierarchies. For instance, the MIPS software tool may instrument executables such as optimized binaries to capture memory access patterns from a program under test at runtime, may apply the memory model of a prospective hardware system, and may use this information to determine optimal data structure placement within memory. A software developer may, for instance, use the MIPS software tool to instrument and run a target software binary and may, after the run is completed, obtain from the MIPS software tool information on memory access statistics and analysis results. In some such example approaches, the analysis results may include actionable advice on how memory allocations in the program can be changed to improve performance.

Figure 2:
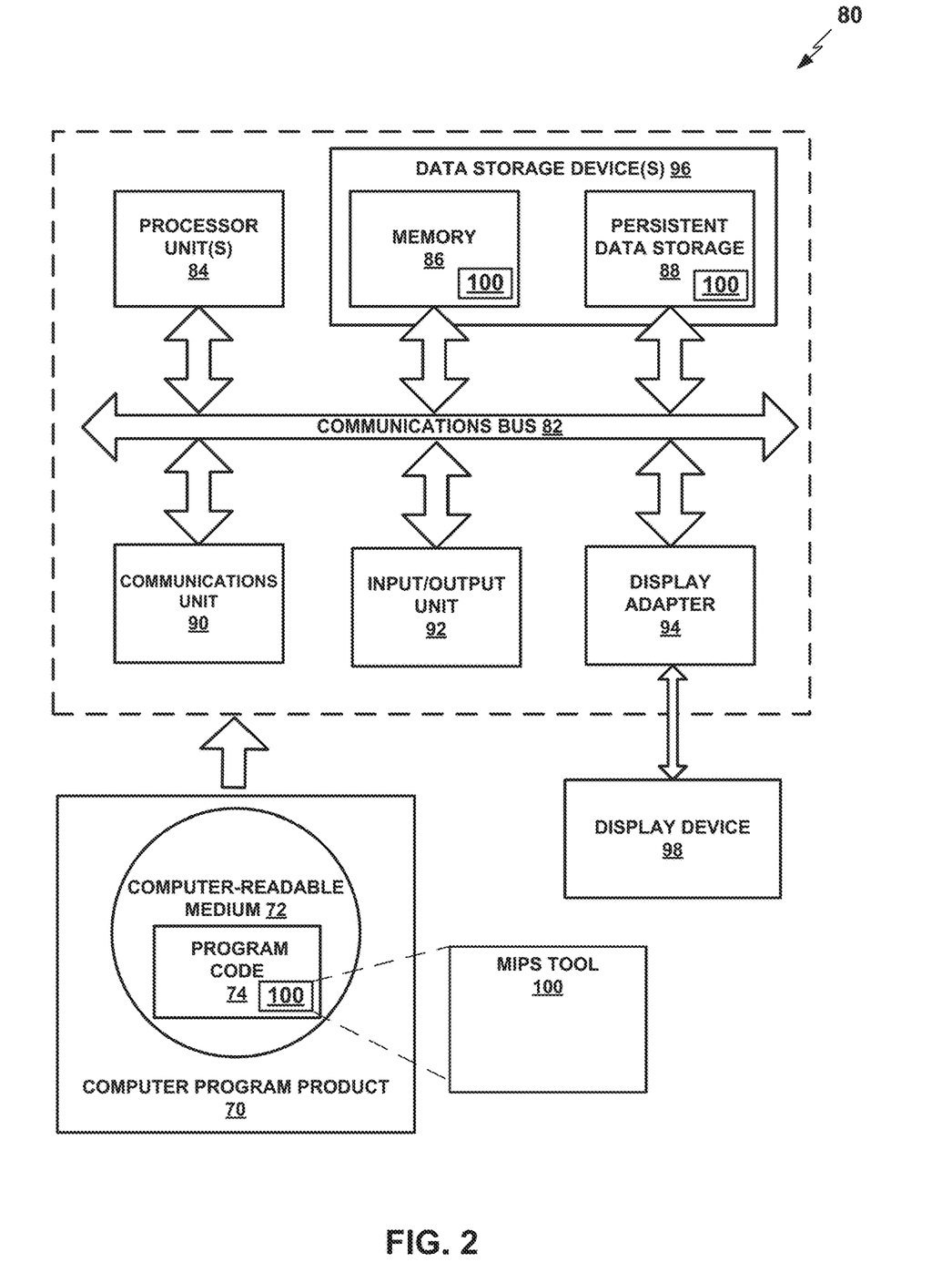
FIG. 2 is a block diagram of an example computing device that may be used to allocate data structures to memories having different performance profiles, in accordance with aspects of the present disclosure.

FIG. 2 is a block diagram of an example computing device 80 that may be used to allocate data structures to memories having different performance profiles, in accordance with aspects of the present disclosure. In various examples, computing device 80, hosting MIPS tool 100, analyzes memory in systems like computer system 10 and places data structures in memory of the system based on the memory analysis. Computing device 80 may be a laptop computer, desktop computer, or any other type of computing device. Computing device 80 may also be a server in various examples, including a virtual server that may be run from or incorporate any number of computing devices. A computing device may operate as all or part of a real or virtual server, and may be or incorporate a specialized air traffic control workstation, other workstation, server, mainframe computer, notebook or laptop computer, desktop computer, tablet, smartphone, feature phone, or other programmable data processing apparatus of any kind. Other implementations of a computing device 80 may include a computer or device having capabilities or formats other than or beyond those described herein.

In the illustrative example of FIG. 2, computing device 80 includes communications bus 82, which provides communications between processor unit 84, memory 86, persistent data storage 88, communications unit 90, and input/output (I/O) unit 92. Communications bus 82 may include a dedicated system bus, a general system bus, multiple buses arranged in hierarchical form, any other type of bus, bus network, switch fabric, or other interconnection technology. Communications bus 82 supports transfer of data, commands, and other information between various subsystems of computing device 80.

Processor 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor, an x86 compatible processor, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage device 96 includes memory 86 and persistent data storage 88, which are in communication with processor unit 84 through communications bus 82. Memory 86 can include a random access semiconductor memory (RAM) for storing application data, e.g., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage device 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage device 96 may include any of various forms of volatile memory that may require being periodically electrically refreshed to maintain data in memory, while those skilled in the art will recognize that this also constitutes an example of a physical computer-readable data storage device. Executable instructions may be stored on a physical medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a technology tracking system 100, as described in greater detail above. This program code may be stored on memory 86, persistent data storage 88, or elsewhere in computing device 80. This program code may also take the form of program code 74 stored on computer-readable medium 72 included in computer program product 70, and may be transferred or communicated, through any of a variety of local or remote means, from computer program product 70 to computing device 80 to be enabled to be executed by processor unit 84, as further explained below. Computer program product 70 may be a computer program storage device in some examples.

The operating system may provide functions such as device interface management, memory management, and multiple task management. The operating system can be a Unix based operating system, a non-Unix based operating system, a network operating system, a real-time operating system (RTOS), or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

In some example approaches, input/output unit 92 supports devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage device 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 70, which includes a computer-readable medium 72 having computer program code 74 stored thereon. For example, computer program product 70 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 72 may include any type of optical, magnetic, or other physical medium that physically encodes program code 74 as a binary series of different physical states in each unit of memory that, when read by computing device 80, induces a physical signal that is read by processor 84 that corresponds to the physical states of the basic data storage elements of storage medium 72, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 74.

In some illustrative examples, program code 74 may be downloaded over a network to data storage device 96 from another device or computer system for use within computing device 80. Program code 74 including computer-executable instructions may be communicated or transferred to computing device 80 from computer-readable medium 72 through a hardline or wireless communications link to communications unit 90 and/or through a connection to input/output unit 92. Computer-readable medium 72 comprising program code 74 may be located at a separate or remote location from computing device 80, and may be located anywhere, including at any remote geographical location anywhere in the world, and may relay program code 74 to computing device 80 over any type of one or more communication links, such as the Internet and/or other packet data networks. The program code 74 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 74 may be transmitted from a source computer-readable medium 72 over mediums, such as communications links or wireless transmissions containing the program code 74. Program code 74 may be more or less temporarily or durably stored on any number of intermediate physical computer-readable devices and mediums, such as any number of physical buffers, caches, main memory, or data storage components of servers, gateways, network nodes, mobility management entities, or other network assets, en route from its original source medium to computing device 80.

In one example, system 80 stores the MIPS software tool on nonvolatile memory such as persistent data storage 88 or computer readable medium 72 as program code 74. In one such example approach, program code 74 includes instructions 100 that, when executed by one or more of the processors 12, establish MIPS software tool on computing system 80. In one example approach, the MIPS software tool performs HPC-oriented data placement optimization across a variety of memory architectures and memory hierarchies. For instance, the MIPS software tool may instrument executables such as binaries to capture memory access patterns from a program under test at runtime, may apply the memory model of a prospective hardware system, and may use this information to determine optimal data structure placement within memory. A software developer may, for instance, use the MIPS software tool to instrument and run a target software binary and may, after the run is completed, obtain from the MIPS software tool information on memory access statistics and analysis results. In some such example approaches, the analysis results may include actionable advice on how memory allocations in the program can be changed to improve performance.

In one example approach, computing system 80 includes one or more processor units 84 and one or more memory components (70, 86, and 88) operably coupled to the one or more processors. The one or more processors are configured to define, in the memory, a computer architecture having a processor connected to one or more first memories and one or more second memories, wherein the first memories and the second memories are characterized by different performance profiles; instrument an executable to capture, during runtime, patterns of access to selected data structures of the executable; and determine, based on an analysis of the patterns of access, allocation of the selected data structures between the first and second memories.

In one example approach, the MIPS software tool is part of a performance analysis toolkit, augmenting the existing overall performance tools framework so that it may be used by developers to guide code modernization and optimization for upcoming HPC platforms. In one such example approach, the MIPS software tool is a software analysis tool that optimizes the runtime efficiency, particularly with respect to memory access, of analyzed software. This is directly applicable to users of HPC systems, and it extends easily to other large-scale computing systems, like cluster computing and multi-node cloud systems. The MIPS software tool of this disclosure may address difficult performance optimization problems in the HPC arena. The MIPS software tool described in this disclosure may be configured to analyze and model real-world software performance and to make optimization suggestions that are usable by a developer without any additional specialized skill set. As such, the MIPS software tool may provide improved performance to developers and users when running their high-fidelity, computationally-intensive software on current and future next-generation HPC hardware architectures. The MIPS software tool may, therefore, dramatically reduce the software engineering effort needed to take full advantage of the improved performance offered by hybrid memory architectures. The result will be faster code execution, leading to shorter run times and the potential for more computationally-demanding tasks, with lower engineering cost. Such a tool may, as noted above, be used to augment an existing overall performance tools framework. As such, the MIPS software tool may be used by developers and users to guide code modernization and optimization for upcoming HPC platforms.

The MIPS software tool may be described in the context of the Intel® Xeon Phi MIC processor described above but may be used for analyzing any HPC architecture. The second generation Intel® Xeon Phi processor, codenamed Knights Landing (KNL), consists of up to 72 cores per processor, with each core capable of 4-way Simultaneous Multi-threading. As noted above, KNL features a more complex memory hierarchy in the form of a high-bandwidth, low-capacity on-package MCDRAM memory (referred to as "near" memory) and off-package traditional DRAM memory (referred to as "far" memory). Significant code refactoring and optimizations efforts may be used to "map" critical computer codes (as described below) to run efficiently on upcoming systems with KNL and similar architectures. Such efforts may be intelligently guided by workload performance characterization and analysis tools, which may inspect the behavior of large-scale, software codes and may suggest refactoring and optimization strategies (e.g., which data structures in the code should be allocated on "near" memory for better performance). One example approach combines a code-centric view (i.e., inspect performance issues in terms of code structures such as loops and functions) with a data-centric view that analyzes performance in terms of key data structures in the codes; in some example approaches, this hybrid approach may be used to guide the preparation for pre-Exascale systems with deep memory hierarchies.

As noted above, it can be difficult to adapt existing software applications to the new memory architectures. Some such codes will not scale and the run times will be prohibitively long without optimization for pre-Exascale architectures. To address the need to improve memory placement for applications as described above, a performance analysis toolkit (augmenting an existing overall performance tools framework) is described, that can be utilized by developers to guide code modernization and optimization on systems with deep memory hierarchies.

In one example approach, the MIPS software tool of this disclosure includes non-intrusive tools that operate on complex software applications. In one such example approach, the tool includes application code profiling tools that work directly on the optimized executables (not source code) and that produce intelligent and actionable insights on data placement (i.e., which data structures in the code are best allocated on "near" versus "far" memory) via direct simulation of the targeted memory configurations. In one example approach, the MIPS software tool further includes mechanisms for adding other performance enhancing features useful for upcoming HPC platforms (e.g., massive on-node multithreading).

In one example approach, the MIPS software tool enables software developers to record the memory usage patterns of software, to accurately model the behavior of the software on different memory hierarchies and with different memory allocation choices, and to use that information to guide memory performance optimization. The MIPS software tool produces intelligent, actionable recommendations that can be used by software developers to easily optimize their software for next-generation HPC architectures. Further, The MIPS software tool support automated memory optimization by the user, so that software can be optimized for a user's particular computational task and hardware without requiring software re-engineering.

In one example approach, the MIPS software tool instruments the program under test for execution on a simulated version of the host computing system. Program instrumentation may be performed at the source code level or at the optimized binary level but, in some example approaches, instrumentation at the binary level is preferable since users have ready access to binaries and binary code can be simulated across libraries, inline assembly code and code inserted by the compiler/linker. In one such example approach, the MIPS software tool implements dynamic binary instrumentation on code loaded in memory of computing system 10.

In one example approach, the MIPS software tool uses a modified qemu user mode emulation capability to implement memory access instrumentation. Qemu is popular open-source virtualization software. Qemu provides user mode emulation, which can be used to "virtualize" a single process, rather than an entire system. In addition, qemu operates on arbitrary binaries, including unmodified, optimized binaries and enables a developer to add arbitrary instrumentation to the emulator, so one can capture a complete trace of memory accesses for the process. Furthermore, qemu uses dynamic recompilation to reduce the overhead cost of emulation. In one example approach, the MIPS software tool uses portions of an existing memory tracing tool, mtrace, implemented using qemu, as needed, to instrument and simulate the program under test.

In another example approach, the MIPS software tool is built on valgrind, a memory analysis tool that uses dynamic recompilation to instrument binaries in a manner similar to qemu. Valgrind has an existing tool, cachegrind, that performs memory access behavior analysis, but it only models two-level cache. Dynamic recompilation tends to lead to faster simulations than achievable in qemu, but some kinds of programs are difficult to dynamically recompile. For them, qemu provides a reasonable, if slower, alternative.

Another benefit of the valgrind implementation is that one can very quickly create an early proof-of-concept implementation of memory access tracing by using its external-debugger support to attach it to a Linux debugger such as GDB, set large-scale memory watchpoints, and then log memory accesses. This approach has the benefit of being very fast to implement.

In yet another example approach, the MIPS software tool instruments memory accesses using static binary rewriting with dyninst. This approach results in faster-running software under test than either of the dynamic-recompilation emulators, but static binary rewriting tends to be fragile.

In one example approach, the MIPS software tool is implemented for Linux systems and for binaries that use C-like ABIs (e.g., C, C++, Fortran). It can be ported to other platforms and languages as well.

In one example approach, the MIPS software tool directly instruments as-built optimized binaries, without requiring source code or modification of the software build process. This makes the MIPS software tool significantly easier to use, since changing the software build process to perform analysis can be a significant burden for complex software. This approach also significantly improves the accuracy of the analysis, since unoptimized or compiler-instrumented binaries will have memory access patterns and performance characteristics that differ significantly from the release-version software. Further, this approach enables the MIPS software tool to work on binaries regardless of the compiler used. The MIPS software tool analyzes binaries equally well on the HPC system (e.g., a Knights Landing system) or on a non-HPC development system (e.g., a conventional x86 system).

In one example approach, the MIPS software tool models the behavior of the complete memory hierarchy of a system. Using data obtained from the binary instrumentation, the MIPS software tool analyzes the performance cost of individual memory accesses and uses this information to determine the performance impact of allocating data structures in different types of memory. A key differentiator between the MIPS software tool and currently-available memory performance analysis tools is that it models the entire memory hierarchy for complex, next-generation memory architectures. This is valuable for memory performance analysis on computing systems 10 implemented on NUMA architectures like the Intel® Xeon Phi architecture, which, as noted above, has a memory architecture that combines conventional multi-level cache, conventional DDR4 RAM, high-bandwidth MCDRAM, and hardware hyperthreading to reduce the impact of memory latency. The MIPS software tool also is effective in analyzing data structure placement in GPU systems, where memory performance optimization is a well-known challenge.

In one example approach, the MIPS software tool directly simulates the memory configurations of a computing system 10 having a deep memory architecture to determine what data should be allocated to what memory region. In one such example approach, data is tracked and allocated at the data structure level. In one example approach, the MIPS software tool performs instrumentation and runtime analysis on optimized executable binaries.

Figure 3:
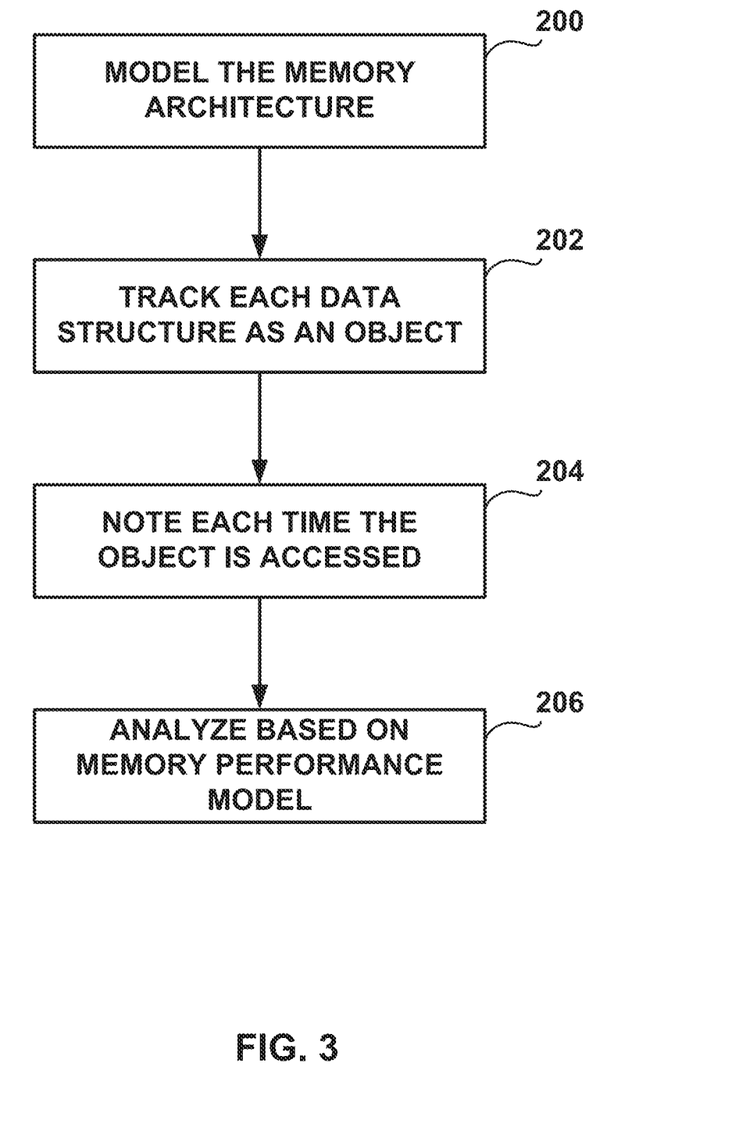
FIG. 3 is a flow diagram illustrating an example method for identifying data structures to assign to computer memory, in accordance with aspects of the present disclosure.

FIG. 3 is a flow diagram illustrating an example method for identifying data structures to assign to computer memory, in accordance with aspects of the present disclosure. A user models the memory architecture of the computing system under test (200) and then instruments the software program under study to track each data structure as an object (202). The MIPS software tool then notes each time the object is accessed (204) and analyzes the access pattern based on the memory performance model (206).

As noted above, the MIPS software tool instruments the software program under study to track each data structure as an object. In one example approach, the MIPS software tool instruments an executable binary before simulating execution of the executable binary on the proposed memory architecture. Features of this type of instrumentation are that it captures the complete memory access patterns of the software under test, including information about timing in between memory accesses, and that it operates on unmodified optimized binaries. In one example approach, a developer, user, or the software itself may configure the software tool to limit the scope of memory accesses to be monitored, recorded, and analyzed by focusing only on specific memory regions. In one model, we assume that the relocatable data of interest in an HPC application is stored in large data structures; the MIPS software tool then use function hooking techniques to intercept functions that allocate and release memory (e.g., malloc, mmap). This information is then used to narrow the scope of what memory accesses are traced. In one such example approach, this component can be disabled in order to trace memory behavior for the entire application, if desired.

Memory simulation and analysis will be discussed next. In one example approach, the MIPS software tool uses the memory access tracing information discussed above to analyze the impact that different memory models have on the performance of the software under test. In one such example approach, the MIPS software tool is designed to be extensible so that it can support a variety of different memory models for different HPC hardware architectures.

In one example approach, the MIPS software tool models the entire memory hierarchy for modern HPC systems and, in addition, models every memory access. Most existing full-coverage tools (e.g., cachegrind) only model parts of the system and are not built to model the unique architecture of systems such as the Knights Landing MIC. Existing memory profiling tools for NUMA architectures typically use sampling instead of tracing every memory access, and so cannot provide an accurate model of the impact of memory access latency.

In one example approach, the MIPS software tool is used to accurately measure the latency and bandwidth of the different memory types of the Intel® Xeon Phi MIC. In addition to a typical Intel multi-level cache architecture and external DDR4 RAM, the Knights Landing MIC has high-bandwidth MCDRAM accessed over a separate high-bandwidth communications link 14. This MCDRAM can be used either as another cache level, as separately-addressable memory, or as both. When used as separately-addressable memory, memory allocations are controlled similar to a NUMA system. In order to accurately model the behavior of memory in a NUMA system, in one example approach, the MIPS software tool models both the latency-how long the processor must wait after a single memory access request to receive the results—and the bandwidth—the sustained data transfer rate supported by the memory. Latency is important to model because the processor can "hide" the cost of high-latency memory requests as long as the processor is able to do useful work that does not depend on the result of the memory request. This is, fundamentally, the motivation for KNL's four-way hardware multithreading-doing useful work in the other three threads while the first is waiting on memory latency. Modern compilers and processors automatically reorder instructions to minimize the impact of latency. The results are then used to produce data placement recommendations, as detailed below.

Figure 4:
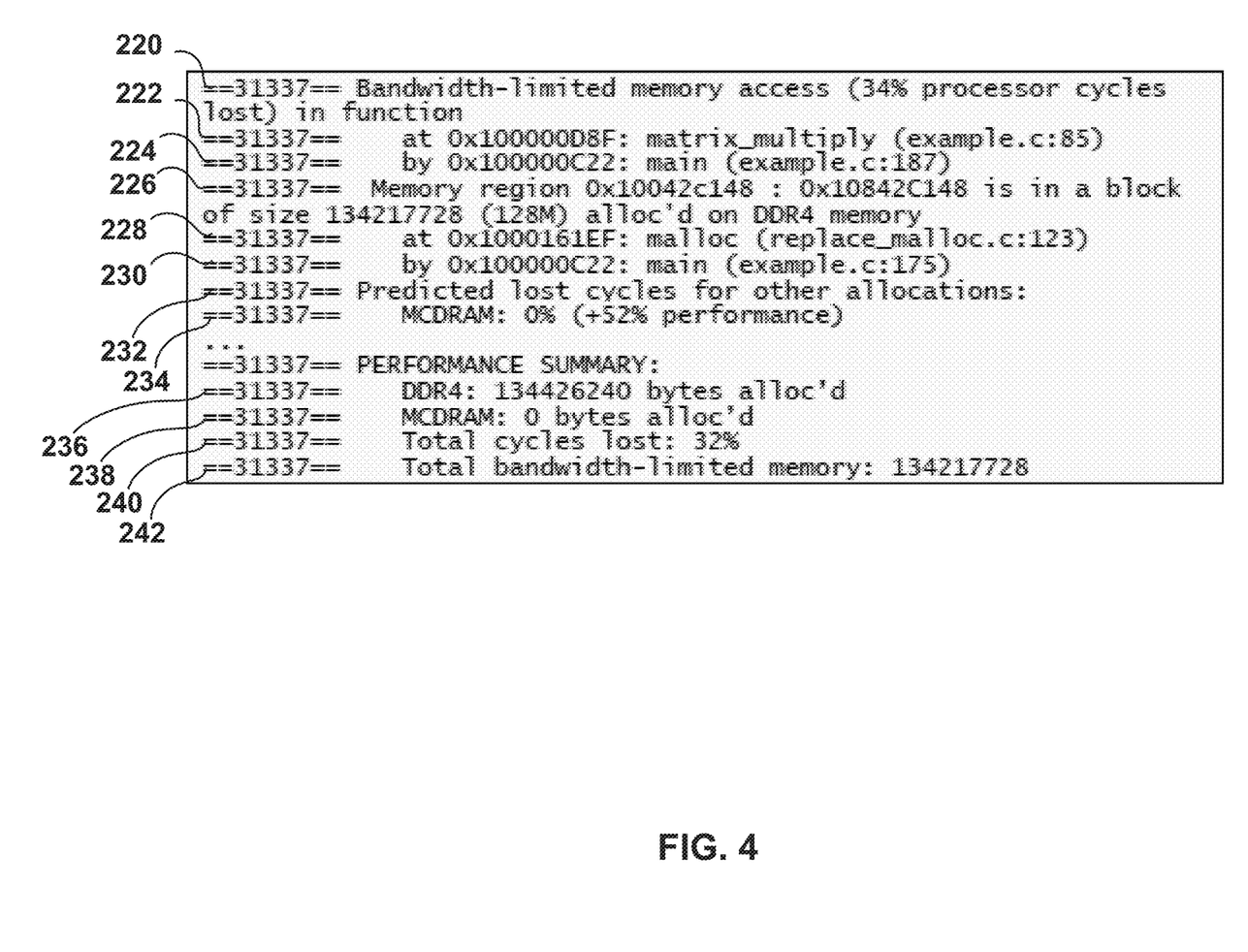
FIG. 4 illustrates one approach for displaying the results of simulation of an optimized binary on a computing system, in accordance with aspects of the present disclosure.

In one example approach, the MIPS software tool produces, and displays to the user, actionable advice on memory placement. In addition to providing statistics on the impact of different memory allocation choices on data structures and particular functions, the MIPS software tool use the gathered information to create a set of memory allocation choices that optimizes the overall performance of the software. This information is then presented to the software developer in a format similar to common performance software quality analysis tools, such as Valgrind. FIG. 4 illustrates one approach for displaying the results of simulation of an optimized binary on a computing system, in accordance with aspects of the present disclosure. In the example approach shown in FIG. 4, MIPS tool 100 executing in one or more processor units 84 displays the results of the analysis performed after a program has been instrumented. As can be seen in FIG. 3, MIPS tool 100 collectively produces raw performance data that is then analyzed based on a memory performance model (206). That analysis transforms the raw performance data into high-level results that are useful to the programmer. The example shown in FIG. 4 is one example approach for displaying this information to the programmer.

Although the present approach generalizes to memory performance analysis, the example illustrated in FIG. 4 is directed to optimizing performance for a processor, like the Intel Knights Landing, that has a separate pool of RAM that is higher-bandwidth. So, while normal computers have just RAM (e.g., DDR4), a computer implementing Knights Landing architecture includes an addition pool of RAM (for Knights Landing, "MCDRAM") that is a scarcer but higher-performing resource.

In the example approach of FIG. 4, entry 220 illustrates the percentage of bandwidth-limited memory access (34% processor cycles lost) in a particular function. Here, the results show that the program ran slower than it could have because the processor had to spend time waiting for data to be transferred to/from RAM. That is, 34% of the processor's time was spent waiting for data rather than in executing instructions. Entries 222 and 224 illustrate the call stack of the function where the lost performance occurred. That is, the function with the reported lost performance is matrix_multiply (222), and that function is being called from main (224).

Entry 226 illustrates the data structure the function (matrix_multiply) is accessing that is causing the lost performance. In the analyzed execution, it was allocated into regular RAM (here, DDR memory). The report illustrated in FIG. 4 shows the memory address of the data structure and the size of the allocated data (here, 128 MB) at 226, and the call stack for where it was allocated (228, 230), which helps the programmer identify the data structure. Here, entries 226, 228 and 230 describe the data structure that the function (matrix_multiply) is accessing that is causing lost performance. As noted above, in the analyzed execution, the data structure was allocated into regular RAM.

In the example approach of FIG. 4, MIPS tool 100 displays predicted lost cycles for other allocations (232, 234). Here, what is displayed indicates that if the data structure was instead allocated into MCDRAM, then instead of losing 34% of processor cycles to data transfer time, we would lose 0%, resulting in a 52% performance increase in the matrix_multiply function. In one example approach, the programmer will see the above information repeated for each function/data structure that causes lost performance.

In one example approach, a summary is displayed at entries 236, 238, 240 and 242. The summary indicates how much memory the program used of each type of RAM (here, only DDR4 and no MCDRAM were allocated as shown at entries 236 and 238), overall performance lost (240), and how much memory used by the program is contributing to performance loss (242). In this case, only the one 128 MiB block reported above is performance-limiting.

A developer may use the output of the MIPS software tool as shown, for example, in FIG. 4 to modify their software to optimize its performance when run on the targeted HPC system. Such an approach means that the MIPS software tool does not require product-specific training or a specialized skill set in order to use.

In one example approach, the MIPS software tool uses the results of the simulation of the optimized binary executing on a memory system to recommend data placement. In one such example approach, the MIPS software tool uses debugging symbols from the software binary to trace the access characteristics and performance impact of memory based on where it is allocated in the source code. In order to be more useful to a developer, recommendations may tie back to source code, which uses debugging symbols. This is similar to the approach used by valgrind, which reports on memory blocks based on their point of allocation. This results in a collection of recommendations as shown in FIG. 4.

Figure 5:
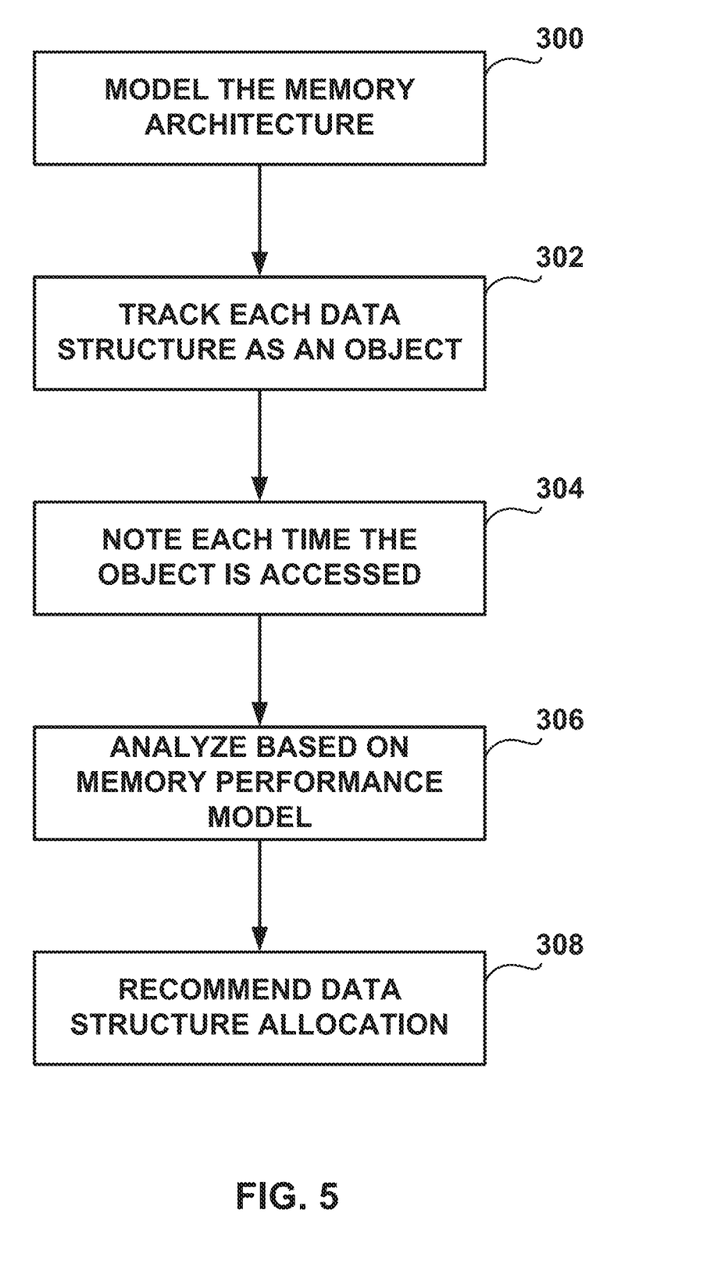
FIG. 5 is a flow diagram illustrating an example method for allocating data structures to specific regions of memory, in accordance with aspects of the present disclosure.

FIG. 5 is a flow diagram illustrating an example method for allocating data structures to specific regions of memory, in accordance with aspects of the present disclosure. A user models the memory architecture of the computing system under test (300) and then instruments the software program under study to track each data structure as an object (302). The MIPS software tool then notes each time the object is accessed (304) and analyzes the access pattern based on the memory performance model (306). The MIPS software tool determines how data structures should be assigned memory, including to specific regions of memory (such as memories 16, 20 and 22 in FIG. 1), based on the analysis (308). In some example approaches, the MIPS software tool also provides information to guide code optimization, such as, for instance, finding parallelization opportunities, determining optimal work size and work unit strategies for parallelized loops, identifying performance-limiting task dependencies, determining the optimal work distribution and scheduling for hardware systems with hardware coprocessors, testing the real-world time and memory complexity of particular functions, and optimizing memory access patterns under many-threaded operation.

In one example approach, the MIPS software tool models memory accesses based on the specifications provided by the device manufacturers. For instance, access to a data object in memory 14 will cost x in latency, while access to a data object in memory 20 will cost y in latency. If a data object is too big for its current memory placement, the MIPS software tool notes the thrashing and, in some example approaches, forms a heat map of the data causing the problem. For instance, if a data object is too big to be placed fully within MCDRAM, one will be able to see similar memory thrashing issues and can take steps to reduce the size, if possible, or move the data object to another region of memory.

The MIPS software tool records the latency costs of each memory access. Memory assignment then becomes an optimization problem.

In one example approach, the MIPS software tool is modular in design to support integration into performance analysis tool suites. For instance, in one such example approach, the modular MIPS software tool is integrated into an existing software performance analysis toolkit (such as IBM Rational Purify, Intel Parallel Studio, Intel Pin, Microsoft Windows Performance Analysis Toolkit, Microsoft Visual Studio Team System Profiler, or the like) and becomes a part of existing software development workflows.

In one example approach, the MIPS software tool is used as part of Typhon as the basis for a collection of HPC-oriented software performance analysis and optimization tools. Typhon is a plugin for Visual Studio that aids developers in transforming single-threaded Component Object Model) COM applications to take advantage of multiple threads. Typhon analyzes the source of legacy COM applications to automatically identify multi-threaded optimization opportunities. When a multi-threaded optimization is provably safe, Typhon automatically transforms code to take advantage of the multi-threaded optimization. When a multi-threaded optimization is not provably safe, Typhon annotates the source to identify the type of optimization and how it could be made safe. Typhon's integration with Visual Studio also enables it to suggest refactoring strategies that may create additional optimization opportunities.

In some example approaches, the MIPS software tool is designed as a system of connected modular components. Such an approach facilitates supporting new instrumentation techniques and memory models. It also streamlines re-using MIPS technologies to develop new performance analysis tools.

The MIPS software tool provides cutting-edge capability to apply memory placement optimization without requiring source code changes. This enables a single software executable to be used on differently-configured systems and for different use cases (e.g., input size) without requiring software re-engineering and without giving up any potential performance. For instance, the MIPS software tool can be used by an end user to test software with their computational task and for their hardware system. The results of these tests may then be used by the MIPS library to automatically and transparently modify memory allocations to achieve optimized performance.

The MIPS software tool advances the state of the art in HPC performance optimization in at least two ways. First, the MIPS software tool combines noninvasive binary instrumentation with complete memory system performance modeling. Second, the MIPS software tool supports optimization by the end user rather than by the developer, resulting in portability to different hardware systems, adaptability to different computational problems, and software future-proofing.

The MIPS software tool enables users and organizations to realize improved performance when running their high-fidelity, computationally-intensive software on current and future next-generation HPC hardware architectures. The MIPS software tool dramatically reduces the software engineering effort needed to take full advantage of the improved performance offered by hybrid memory architectures. The result is faster code execution, leading to shorter run times and the potential for more computationally-demanding tasks, with lower engineering cost. The techniques described above help software developers and users assign data structures to memories having different performance profiles, allowing simplified migration of software programs into computing systems having non-uniform memory architectures. Various example implementations of this disclosure include systems, methods, devices, and techniques for analyzing a broad range of memory architectures and for mapping data structures in software programs to appropriate memory to take advantage of the different memory architectures.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise random access memory (RAM), read-only memory (ROM), electrically erasable programmable read-only memory (EEPROM), compact disc read-only memory (CD-ROM) or other optical disk storage, magnetic disk storage, or other magnetic storage devices, flash memory, or any other storage medium that can be used to store desired program code in the form of instructions or data structures and that can be accessed by a computer. Also, any connection may properly be termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, which may reproduce data magnetically, or optically, e.g., readable using a laser. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set or a system on a chip (SoC)). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

Depending on the embodiment, certain acts or events of any of the methods described herein may be performed in a different sequence, or may be added, merged, or left out altogether (e.g., not all described acts or events are necessary for the practice of the method). Moreover, in certain embodiments, acts or events may be performed concurrently, e.g., through multi-threaded processing, interrupt processing, parallel processing or otherwise with multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that may change over time (e.g., in RAM or cache), even on short time scales, yet is at least temporarily physically (e.g., magnetically, electrically, optically) embodied in a physical data storage or memory structure, and thus is distinguished from a transitory medium.

Various examples have been described. These and other examples are within the scope of the following claims.

What is claimed is:

1. A system comprising:
   one or more processors; and
   a memory operably coupled to the one or more processors, the memory including an executable of a software program;
   wherein the one or more processors are configured to:
   define, in the memory, a computer architecture model having a processor connected to a high-bandwidth random access memory and a main random access memory, wherein the high-bandwidth random access memory operates at a lower latency than the main random access memory, wherein the high-bandwidth random access memory and the low-bandwidth random access memory are separately addressable by the software program during execution at the processor, and wherein the computer architecture model models bandwidth and latency of the main random access memory and the high-bandwidth random access memory;
   instrument the executable of the software program, without modifying source code of the software program, to capture, during runtime, patterns of memory access to allocated memory by the software program during execution at the processor of the high-bandwidth random access memory and the main random access memory to selected data structures of the executable;
   execute the instrumented executable on the computer architecture model to capture the patterns of memory access of the high-bandwidth random access memory and the main random access memory to selected data structures of the executable access by the software program during execution at the processor;
   analyze performance costs of the patterns of memory access; and
   output, based on the analysis of the performance costs of the patterns of memory access, an allocation of the selected data structures between the high-bandwidth random access memory and the main random access memory.

2. The system of claim 1, wherein the processor from the computer architecture model includes a plurality of cores, wherein each core accesses the high-bandwidth random access memory and the main random access memory independently of the other cores and wherein the one or more processors configured to output, based on the analysis of the performance costs of the patterns of memory access, the allocation of the selected data structures are further configured to output the allocation of the selected data structures between the high-bandwidth random access memory and the main random access memory based on an expectation that the executable of the software program will be distributed across two or more of the plurality of cores.

3. The system of claim 2, wherein the cores are multi-threading cores.

4. The system of claim 1, wherein the high-bandwidth random access memory is not a cache level memory for the main random access memory.

5. A method, comprising:
   defining a computer architecture model having a processor connected to a high-bandwidth random access memory and a main random access memory, wherein the high-bandwidth random access memory operates at a lower latency than the main random access memory, wherein the high-bandwidth random access memory and the low-bandwidth random access memory are separately addressable by a software program during execution at the processor, and wherein the computer architecture model models bandwidth and latency of the main random access memory and the high-bandwidth random access memory;
   instrumenting an executable of the software program, without modifying source code of the software program, to capture, during runtime, patterns of memory access of the high-bandwidth random access memory and the main random access memory to selected data structures of the executable;

executing the instrumented executable on the computer architecture model to capture the patterns of memory access of the high-bandwidth random access memory and the main random access memory by the software program during execution at the processor to selected data structures of the executable;

analyzing performance costs of the patterns of memory access; and outputting, based on the analysis of the performance costs of the patterns of memory access, an allocation of the selected data structures between the high-bandwidth random access memory and the main random access memory.

6. The method of claim 5, wherein the processor from the computer architecture model includes a plurality of cores, wherein each core accesses the high-bandwidth random access memory and the main random access memory independently of the other cores and wherein outputting, based on the analysis of the performance costs of the patterns of memory access, the allocation of the selected data structures includes outputting the allocation of the selected data structures between the high-bandwidth random access memory and the main random access memory based on an expectation that the executable of the software program will be distributed across two or more of the plurality of cores.

7. The method of claim 5, wherein instrumenting the executable of the software program includes identifying key data structures in the executable of the software program and instrumenting only the key data structures.

8. The method of claim 5, wherein instrumenting includes modifying the executable of the software program to intercept functions that allocate and release memory.

9. The method of claim 5, wherein instrumenting includes modifying the executable of the software program to display processor cycles lost in executing a particular function.

10. The method of claim 5, wherein instrumenting includes modifying the executable of the software program to display processor cycles lost in executing a particular function and a call stack associated with the particular function.

11. The method of claim 5, wherein instrumenting includes modifying the executable of the software program to display processor cycles lost in executing a particular function, a data structure associated with the particular function, and a prediction of lost cycles if the data structure associated with the particular function was allocated to a different type of memory.

12. The method of claim 5, wherein instrumenting includes providing programming code for guiding code optimization.

13. The method of claim 5, wherein instrumenting includes performing dynamic recompilation to reduce overhead cost of emulation.

14. A computer-readable data storage device storing instructions that, when executed, cause a computing device comprising one or more processors to:

define, in one or more memory components, a computer architecture model having a processor connected to a high-bandwidth random access memory and a main random access memory, wherein the high-bandwidth random access memory operates at a lower latency than the main random access memory, wherein the high-bandwidth random access memory and the low-bandwidth random access memory are separately addressable by a software program during execution at the processor, and wherein the computer architecture model models bandwidth and latency of the main random access memory and the high-bandwidth random access memory;

instrument an executable of the software program, without modifying source code of the software program, to capture, during runtime, patterns of memory access of the high-bandwidth random access memory and the main random access memory by the software program during execution at the processor to selected data structures of the executable;

execute the instrumented executable on the computer architecture model to capture the patterns of memory access of the high-bandwidth random access memory and the main random access memory to selected data structures of the executable;

analyze performance costs of the patterns of memory access; and output, based on the analysis of the performance costs of the patterns of memory access, an allocation of the selected data structures between the high-bandwidth random access memory and the main random access memory.

15. The computer-readable data storage device of claim 14, wherein the processor from the computer architecture model includes a plurality of cores, wherein each core accesses the high-bandwidth random access memory and the main random access memory independently of the other cores and wherein the instructions that, when executed, cause the computing device to output, based on the analysis of the performance costs of the patterns of memory access, the allocation of the selected data structures include instructions that, when executed, cause the computing device to output the allocation of the selected data structures between the high-bandwidth random access memory and the main random access memory based on an expectation that the executable of the software program will be distributed across two or more of the plurality of cores.

* * * * *